Jan. 6, 1970  B. E. SULLIVAN  3,487,604
METHOD OF PACKAGING WIPING CLOTHS
Original Filed Sept. 29, 1965  2 Sheets-Sheet 1
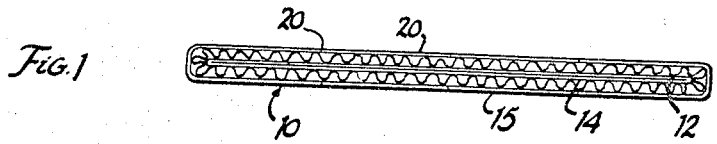
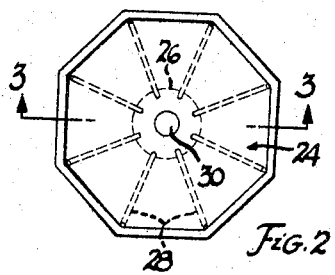
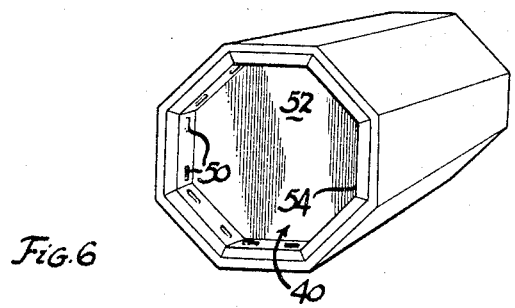
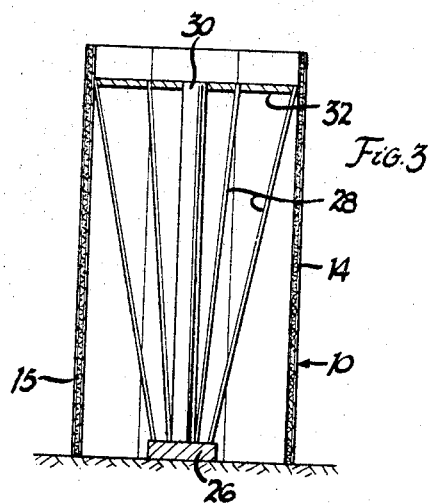
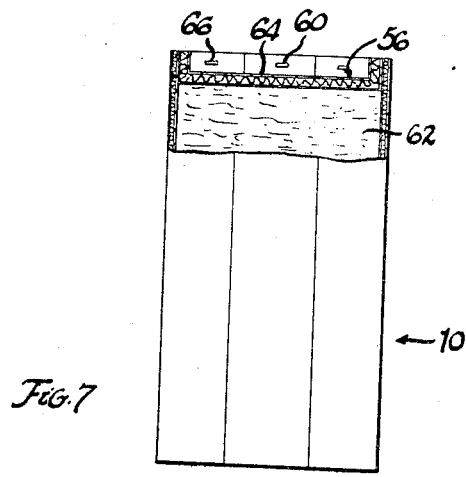
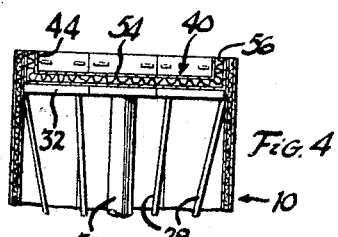
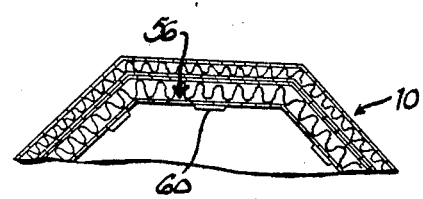
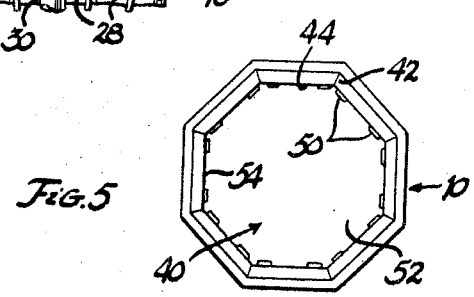
Inventor.
BERNARD E. SULLIVAN
By Whittemore,
Hulbert & Belknap
Attys.

Jan. 6, 1970   B. E. SULLIVAN   3,487,604
METHOD OF PACKAGING WIPING CLOTHS
Original Filed Sept. 29, 1965   2 Sheets-Sheet 2
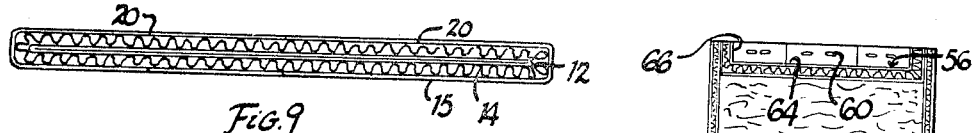
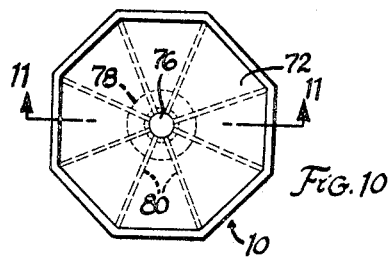
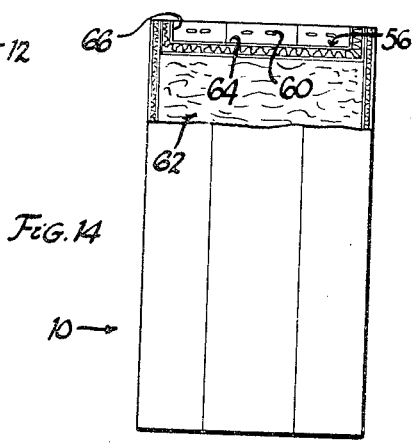
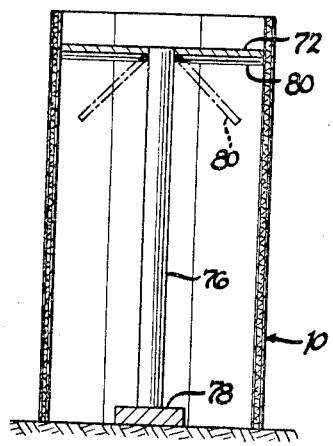
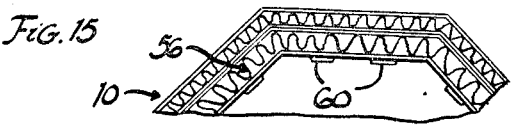
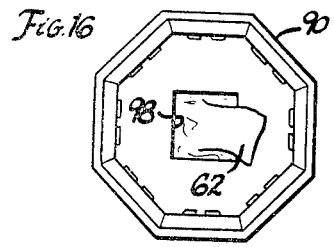
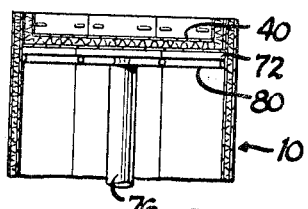
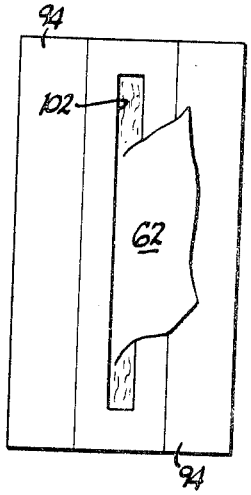
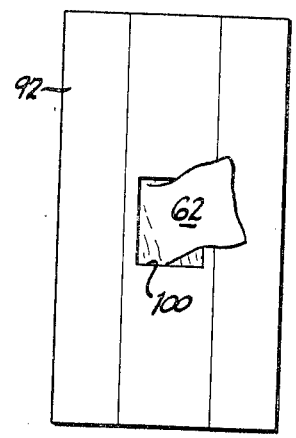
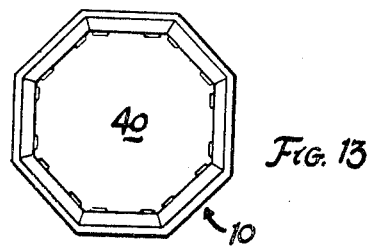
Inventor.
BERNARD E. SULLIVAN
By Littemore,
Hulbert & Belknap
ATT'YS.

United States Patent Office

3,487,604
Patented Jan. 6, 1970

1

3,487,604
METHOD OF PACKAGING WIPING CLOTHS
Bernard E. Sullivan, Bloomfield Hills, Mich., assignor to O'Brien Textiles Corporation, Highland Park, Mich., a corporation of Michigan
Original application Sept. 29, 1965, Ser. No. 491,092, now Patent No. 3,424,304, dated Jan. 28, 1969. Divided and this application Aug. 14, 1967, Ser. No. 663,919
Int. Cl. B65b 9/10, 43/26, 67/02
U.S. Cl. 53—29     6 Claims

ABSTRACT OF THE DISCLOSURE

The method of packaging wiping cloths comprises first placing a box element over a frame to form the element into more than four sides. Preferably the box element has eight sides. A cup-shaped end member is then inserted in one end thereof in spaced relation to the end of the element. The box element is then inverted to insert wiping cloths therein. Finally, the opposite end of the element is closed by means of a cup-shaped member and a slot is provided in one wall of the package for removal of wiping cloths.

RELATED APPLICATION

This application is a division of my copending application Ser. No. 491,092, filed Sept. 29, 1965, now Patent No. 3,424,304.

BACKGROUND OF THE INVENTION

It has been previously proposed to bale wiping cloths by using old pieces of paper or burlap to wrap the cloths and bind the package with wire or other binding material. This arrangement did not provide a bin for the storage of used wiping cloths nor any storage bin or container for unused cloths and no provision for the return of soiled cloths for reclamation.

SUMMARY OF THE INVENTION

The method of packaging wiping cloths comprises placing a flexible box element over a frame to shape the element in cross-section into more than four sides while leaving a portion thereof to receive a cup-shaped end portion extending above the frame. A cup-shaped end portion is inserted into the end of the element with the bottom of the cup being spaced inwardly of the end of the box element and adjacent to the frame. The side wall of the cup is engaged with the interior wall of the box element between the bottom of the cup and the end of the element. The side wall of the cup-shaped element is then secured to the interior of the box element with the bottom wall of the cup-shaped member being in spaced relation adjacent to the ends thereof. The box element is then removed from the frame and inverted. The wiping cloths are then inserted into the box element. A second cup-shaped member is inserted into the opposite end of the box element. This member is secured to the box element with the bottom of the cup-shaped member in spaced relation to the end of the box element and the side walls extending toward the end of the box element. A slot is provided in a wall of the box element for removal of wiping cloths therefrom.

It is an object of my invention to provide a new method of packaging wiping cloths.

Another object of my invention is to provide a method of packaging wiping cloths by placing a box element over a frame to form the element into more than four sides and to insert a cup-shaped end member in one thereof in spaced relation to the end of the element and then invert the element to insert wiping cloths therein and then closing the opposite end of the element with a cup-shaped member and positioning it in spaced relation to the last named end of the element.

A further object of my invention is to provide a package containing wiping cloths which package may be used to store the unused cloths or return the soiled cloths for reclamation, which package is constructed of more than four sides for strength and is provided with cup-shaped ends which serve as handles.

Other objects of this invention will appear in the following description and appended claims, reference being had to the accompanying drawings forming a part of this specification wherein like reference characters designate corresponding parts in the several views.

In the drawings:

FIGURE 1 is a top view in elevation of a box element before formed and embodying features of my invention;

FIGURE 2 shows a top view of the box element shown in FIGURE 1 formed over a frame;

FIGURE 3 shows a side view in cross-section of the box element and frame taken in the direction of arrows 3—3 of FIGURE 2;

FIGURE 4 is a side fragmentary view in cross-section of the box element, frame and end member positioned in the bottom of the box element;

FIGURE 5 is a bottom view of the container showing the box element with the bottom end member stapled in the box element;

FIGURE 6 is a view in perspective of a completed package of wiping cloths;

FIGURE 7 is a side view of the container showing the box element partly broken away and containing wiping cloths and the top end member stapled to the box element;

FIGURE 8 is a fragmentary end view of the container shown in FIGURE 7;

FIGURE 9 is a top view in elevation of a box element before formed;

FIGURE 10 is a top view of the box element formed over a modified form of frame;

FIGURE 11 is a view taken in the direction of the arrows 11—11 of FIGURE 10;

FIGURE 12 is a side fragmentary view in cross-section of the box element, modified frame and end member positioned in the bottom of the box element;

FIGURE 13 is a fragmentary view of the container showing the box element with the bottom end member stapled in the box element;

FIGURE 14 is a side view of the container showing the box element partly broken away and containing wiping cloths and the top end member stapled to the box element;

FIGURE 15 is a fragmentary end view of the container shown in FIGURE 14;

FIGURE 16 is an end view of a container showing a removal slot in an end wall thereof;

FIGURE 17 is a side view of a container showing a long removal slot in a side wall thereof; and FIGURE 18 is a side view of a container showing a modified removal slot in a side wall thereof.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In accordance with my invention I provide a method of packaging wiping cloths so that they may be easily transported and used. One way of using it is to open the top end of the packaged container and empty the wiping cloths into a clean bin and as soiled deposited into the container to be returned for reclamation. Another way is to provide removal slots in the side or top walls of the container to remove a cloth as facial tissues are from a box and the soiled cloths retained until the container is emptied to be used as a shipping carton for the return thereof. In either manner the user will always be able to obtain a clean wiping cloth and have provisions for the return of the soiled cloths for reclamation.

I have found that by making the container in more than four sides but not round a very durable container is provided when made with six to twelve sides. The corners on the container serve as supporting ribs and give added strength to lightweight containers. An eight sided container is herein shown and is preferred for various sizes.

Referring to the drawings, FIGURES 1 to 8 show the various steps of the method of packaging wiping cloths. In FIGURE 1, there is shown a box element 10 in the flat and in this instance is made of corrugated paper having an inner wall 12, corrugated wall 14 and outer wall 15. The box element may be made of cardboard or other suitable flexible material if desired. The box element is scored as at 20 in eight places throughout the length of element 10 so that when formed it will have eight sides. The word scored as herein used includes creased or notched. The box element may be of material flexible enough to be formed without being scored.

The first step in the method is to place the box element 10 over a frame 24 as shown in FIGURES 2 and 3. The frame 24 includes a base 26, supports 28, center post 30 and upper plate 32. The supports 28 and center post 30 are supported on their lower ends on base 26 and support plate 32 on their upper ends. It will be noticed in FIGURE 3 that the box element 10 extends a sufficient distance above the frame 24 to provide a space in the box element 10 above frame 24 to receive an end member. While a fixed mechanical frame has been described, it will be appreciated that an hydraulically or pneumatically actuated frame may also be used. The next step is to insert a cup-shaped end member 40 into the bottom of the box element 10. FIGURES 4, 5 and 6 show the member 40 in position in the bottom of element 10. The member 40 is of the same type corrugated material as box element 10. The member 40 is spliced at 42 or at eight corners to form an octagonal form. When the splicing is completed the spliced sides 44 are moved upwardly to form the cup-shaped member 40. The member 40 may be made of two ply corrugation instead of single ply as shown to provide additional strength if desired. Because the member 40 forms the bottom wall of the container it is secured to the box element at each corner by staples 50. Stapling at each corner provides greater strength than stapling at the central part of each side. As shown in FIGURES 4 and 6, the cup-shaped member 40 is positioned with the bottom wall 52 in spaced relation to the end of the element 10 and the side wall 54 thereof extending from the bottom wall 52 toward the end of the element 10 to provide a handle portion at the bottom end thereof.

After the end member 40 is inserted the box element 10 is removed from the frame 24 and inverted to receive a cup-shaped end member 56 as shown in FIGURES 7 and 8 in the top end of the box element 10. The cup-shaped member 56 is the same as member 40 but is secured to the box element 10 by staples 60 which are stapled in the side walls between the corners instead of at the corners because no appreciable weight is applied to the top end member 56. Before the member 56 is placed in position the wiping cloths are inserted into the element 10 up to a predetermined point just leaving enough space thereabove to receive the member 56 with the bottom wall 64 placed toward the interior of element 10 and the side wall 66 extending from the bottom wall 64 toward the end of the element 10 so that the bottom wall 64 is in spaced relation to the end of the element 10 to provide a handle portion at the top end of the container the same as the bottom end thereof.

FIGURE 9 to 15 show the packaging method over a modified frame 70. The frame 70 is of the umbrella type which has ribs 72 pivotally mounted on a center post 76 supported by base 78. The ribs 72 may be raised when it is desired to form the element 10 and lowered when not in use as shown at 80.

FIGURE 9 shows the element 10 before being formed. FIGURES 10 and 11 show the box element 10 formed over the frame 70 with the element 10 extending above the top of frame 70 to receive the end member 40. FIGURES 12 and 13 show the end member 40 in place. FIGURES 14 and 15 show the top end member 56 in place.

FIGURES 16, 17 and 18 show the containers 90, 92 and 94 with removal slots 98, 100 and 102, respectively. The containers are of different sizes to 75, 150 and 200 pounds capacity or any other desirable size. The container 90 is small and has the removal slot 98 in an end wall thereof. Container 92 is an intermediate size and has a slot 100 in a side wall thereof. Container 94 is large and has an elongated slot in a side wall substantially from end to end. These slots permit the ready removal of one cloth at a time. Each of the containers 90, 92 and 94 are constructed in the same manner as shown in FIGURES 1 to 9 inclusive, and includes the same parts and arrangement thereof including the wiping cloths.

Although only preferred forms of the invention have been illustrated, and those forms described in detail, it will be apparent to those skilled in the art that various modifications may be made therein without departing from the spirit of the invention or from the scope of the appended claims.

What I claim as my invention is:

1. The method of packaging wiping cloths comprising placing a box element over a frame to shape the element in horizontal cross-section to more than four sides while leaving a portion thereof extending above said frame, inserting an end portion into said element above said frame to close one end of said element, securing said end portion to said element in spaced relation adjacent the end thereof, removing the element from said frame and inverting said element, inserting the cloths into said element, inserting an end portion into the opposite end of said element and securing the last named end portion to the last named end of said element in spaced relation to the end of said element.

2. The method of packaging wiping cloths as defined in claim 1, further characterized in that said first-mentioned end portion is cup-shaped and is inserted into the end of the box element with the bottom of the cup spaced inwardly of the end of the box element and adjacent said frame with the side wall of the cup being in engagement with the interior wall of the box element between the bottom of the cup and the end of the box element, securing the side wall of the cup-shaped element to the interior of said box element with the bottom wall of the cup-shaped member being in spaced relation adjacent to the end of the box element, said second-mentioned end portion being a like cup-shaped member, and securing the latter cup-shaped member to the last mentioned end of said element with the bottom of the cup-shaped member in spaced relation to the end of said box element and the side walls thereof extending toward the end of the box element.

3. The method of packaging wiping cloths as defined in claim 2, wherein the cloths are positioned in the element to a predetermined point to permit a like cup-shaped member to be received in the second named end of the element with the bottom of the cup-shaped member being adjacent said cloths.

4. The method of packaging wiping cloths as defined in claim 1, wherein a slot is formed in a wall of the box element for removal of wiping cloths one-by-one to the end that removal of one wiping cloth tends to place an adjacent wiping cloth in position for removal.

5. The method of packaging wiping cloths as defined in claim 4, wherein the removal slot is formed in one side of the box element.

6. The method of packaging wiping cloths as defined in claim 4, wherein the slot is formed in one of the cup-shaped members.

References Cited

UNITED STATES PATENTS 3,333,685   8/1967   Pezdek _____ 206—46

THERON E. CONDON, Primary Examiner

R. L. SPRUILL, Assistant Examiner

U.S. Cl. X.R.

53—37